(12) United States Patent
Caputo

(10) Patent No.: US 10,927,520 B1
(45) Date of Patent: Feb. 23, 2021

(54) WATERTIGHT FLEXIBLE FLOOD BARRIER SYSTEM

(71) Applicant: Mooring Manufacturing LLC, Jupiter, FL (US)

(72) Inventor: Robert G. Caputo, Jupiter, FL (US)

(73) Assignee: Mooring Manufacturing LLC, Jupiter, FL (US)

( * ) Notice: Subject to any disclaimer, the term of this patent is extended or adjusted under 35 U.S.C. 154(b) by 0 days.

(21) Appl. No.: 16/855,407

(22) Filed: Apr. 22, 2020

Related U.S. Application Data

(60) Provisional application No. 62/971,351, filed on Feb. 7, 2020.

(51) Int. Cl.
| | |
|---|---|
| *E02B 7/02* | (2006.01) |
| *E02B 3/10* | (2006.01) |
| *E02B 7/00* | (2006.01) |
| *E02B 3/16* | (2006.01) |
| *E02B 3/12* | (2006.01) |

(52) U.S. Cl.
CPC ............ *E02B 7/005* (2013.01); *E02B 3/102* (2013.01); *E02B 3/106* (2013.01); *E02B 3/126* (2013.01); *E02B 3/16* (2013.01)

(58) Field of Classification Search
CPC .......... E02B 7/005; E02B 3/102; E02B 3/104; E02B 3/106; E02B 3/122; E02B 3/126
USPC .................................................... 405/91, 115
See application file for complete search history.

(56) References Cited

U.S. PATENT DOCUMENTS

| | | | | |
|---|---|---|---|---|
| 2,914,776 A | * | 12/1959 | Hotz | E04D 13/1415 4/499 |
| 3,734,443 A | * | 5/1973 | Fukuda | E02B 7/005 248/506 |
| 3,975,915 A | * | 8/1976 | Haw | E02B 7/005 405/110 |
| 4,659,252 A | * | 4/1987 | Sexton | E02B 7/02 405/109 |
| 4,887,626 A | * | 12/1989 | Dalo | E04H 15/644 135/119 |
| 5,092,707 A | * | 3/1992 | Obermeyer | E02B 7/005 137/386 |
| 5,713,699 A | * | 2/1998 | Obermeyer | E02B 7/005 405/115 |
| 6,354,762 B1 | * | 3/2002 | Muramatsu | E02B 7/005 405/107 |
| 6,460,299 B1 | | 10/2002 | Burrow | |
| 6,567,341 B2 | | 5/2003 | Dreyer et al. | |

(Continued)

FOREIGN PATENT DOCUMENTS

| | | | | | |
|---|---|---|---|---|---|
| GB | 2570567 A | * | 7/2019 | | E02B 3/102 |
| WO | WO-2019213713 A1 | * | 11/2019 | | E02B 3/102 |

*Primary Examiner* — Frederick L Lagman
(74) *Attorney, Agent, or Firm* — McHale & Slavin, P.A.

(57) ABSTRACT

Disclosed is an improved flexible flood barrier system for creating a watertight barrier. The system includes a novel hinged clamping bar assembly configured to engage a hem of the fabric flood barrier. The fabric flood barrier is comprised of a waterproof layer reinforced with Kevlar straps. The Kevlar straps are weaved together through slots in one of the layers without the need for stitching upon any of the waterproof layers. When deployed the improved fabric flood barrier system prevents storm surges from breaching the flexible flood barrier system at the attachment points.

9 Claims, 10 Drawing Sheets

(56) References Cited

U.S. PATENT DOCUMENTS

| | | | |
|---|---|---|---|
| 6,991,403 B1* | 1/2006 | Hendee | E02B 3/16 24/460 |
| 7,178,792 B2 | 2/2007 | Monahan et al. | |
| 8,622,112 B2 | 1/2014 | Tremaine, III et al. | |
| 8,887,789 B2 | 11/2014 | Tremaine, III et al. | |
| 9,303,423 B2 | 4/2016 | Cadogan et al. | |
| 9,453,314 B2 | 9/2016 | Cadogan et al. | |
| 9,453,316 B1 | 9/2016 | Cadogan et al. | |
| 9,598,851 B2 | 3/2017 | Cadogan et al. | |
| 2003/0143027 A1* | 7/2003 | Obermeyer | E02B 7/20 405/115 |
| 2008/0247825 A1 | 10/2008 | Bonds | |
| 2012/0207545 A1 | 8/2012 | Bouchard et al. | |
| 2012/0230768 A1 | 9/2012 | Rowland et al. | |
| 2012/0291355 A1 | 11/2012 | Cloninger et al. | |
| 2013/0094906 A1 | 4/2013 | Rijaarsdam | |
| 2014/0110066 A1 | 4/2014 | Rijaarsdam | |

* cited by examiner

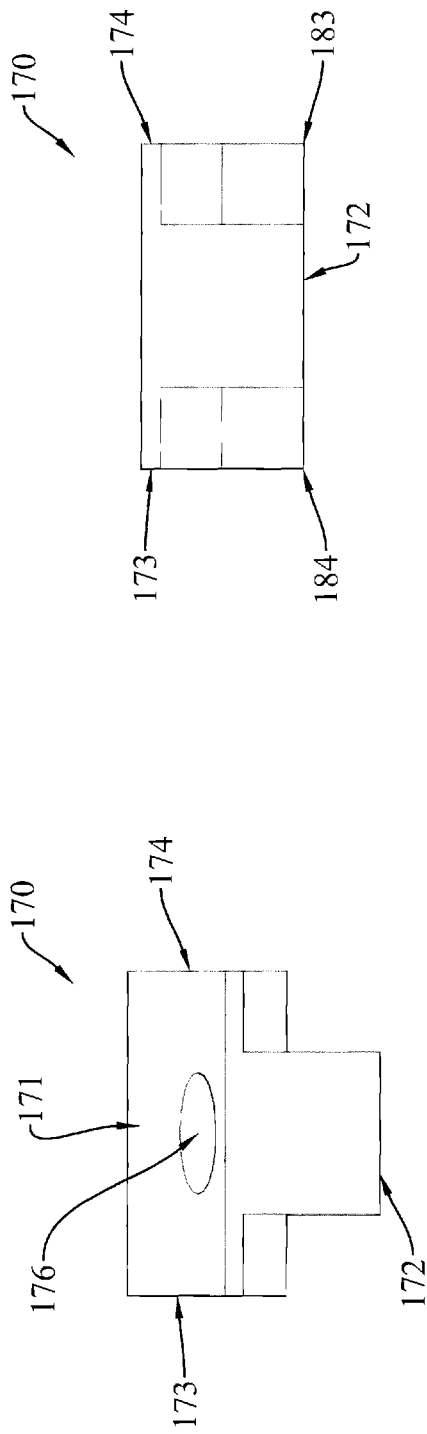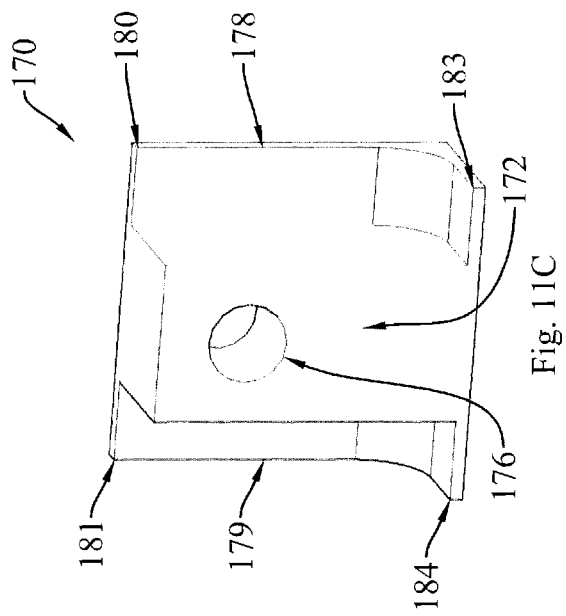
Fig. 11A
Fig. 11B
Fig. 11C

WATERTIGHT FLEXIBLE FLOOD BARRIER SYSTEM

PRIORITY CLAIM

In accordance with 37 C.F.R. § 1.76, a claim of priority is included in an Application Data Sheet filed concurrently herewith. Accordingly, the present invention claims the priority of U.S. Patent Application No. 62/971,351 filed Feb. 7, 2020 entitled "WATERTIGHT FLEXIBLE FLOOD BARRIER SYSTEM" the contents of which are hereby expressly incorporated by reference.

FIELD OF THE INVENTION

This invention is related to the field of flood barriers, particularly, to a flexible flood barrier with an improved anchoring assembly.

BACKGROUND OF THE INVENTION

Flooding of urban areas is a major problem that will continue to increase as sea levels rise and the earth continues to warm. Every year, major storm surges cause trillions of dollars in damage to infrastructure. Additionally, water main ruptures and gray water runoff can cause significant amounts of damage.

Cities such as New York City for example, have many underground structures including malls, parking facilities and subways. Each one of these underground structures are susceptible to massive flooding and the corresponding catastrophic destruction.

Floods can often be extremely difficult to predict. Many rigid flood barrier systems exist in the prior art, but often these systems are rigid flood barrier systems fixed permanently in place and consequently are not feasible for large active building and subway entrances. Additionally, rigid flood barrier systems require longer installation times and cannot be deployed quickly enough to mitigate flood damage in an emergency.

Therefore, a flexible flood barrier that is easily deployable is what is desirable to install in active, heavily trafficked locations. Although many fabric flood barriers exist in the prior art, a problem encountered is that they are prone to leakage at the attachment points, which ultimately cause failure and consequentially, serious damage to the structures result. Therefore, what is needed is a watertight flexible flood barrier system with a novel clamping bar assembly. The system includes a fabric flood barrier with a hem that cooperates with a device that creates a watertight seal along the attachment points to withstand storm surges and variable water level rise.

SUMMARY OF THE INVENTION

The present invention is an improved flexible flood barrier system for creating a watertight barrier. The system includes a novel hinged clamping bar assembly configured to engage a hem of the fabric flood barrier. The flood barrier system comprises a PVC (polyvinyl chloride) coated polyester waterproof membrane having a perimeter formed by an upper edge, a bottom edge, a left side edge and a right side edge further defining a front surface and a rear surface.

A plurality of PVC coated polyester strips are spaced apart and heat welded to the front surface of the membrane. Each of the polyester strips include a spaced apart predetermined slots wherein horizontal straps extending from the left side edge to the right side edge woven through the slots. A plurality of vertical straps extending from the upper edge to the bottom edge woven through predetermined slots formed in the spaced apart strips.

A hem is formed along the perimeter, the hem having a rope extending along each edge of the membrane wherein the membrane edge is wrapped around the rope with a plurality of notches for receipt of strap ends which are passed through each notch and looped around the rope and returned through each notch. Each strap is stitched to itself to create closure and the membrane is heat welded to itself around notch to create a waterproof seal.

A clamp bar assembly is used to secure the hem, the claim bar assembly having a top surface, a bottom surface, a first side and a second side with a recessed shelf extending along a longitudinal axis adjacent to the first side surface with an annular groove disposed at a predetermined depth below the recessed shelf. The clamp bar is comprised of a plurality of pressing blocks connected with a plurality of hinge assemblies for securing the hem in the annular groove.

Accordingly, it is an objective of the instant invention to have a segmented hinged clamping bar system with an adjustable hinge that is scalable to accommodate a multitude of different applications.

It is a further objective of the instant invention to provide waterproof layers heat welded together and reinforced with Kevlar straps.

It is yet another objective of the present invention to weave the Kevlar straps together through slots in one of the layers without the need for stitching upon any of the waterproof layers.

It is a further objective of the instant invention that when deployed, the improved fabric flood barrier system prevents storm surges from breaching the flexible flood barrier system at the attachment points.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 11A is a top view of an alternate hinge block

FIG. 11B is a bottom view thereof; and

FIG. 11C is a perspective view thereof.

DETAILED DESCRIPTION OF THE INVENTION

Figure 1:
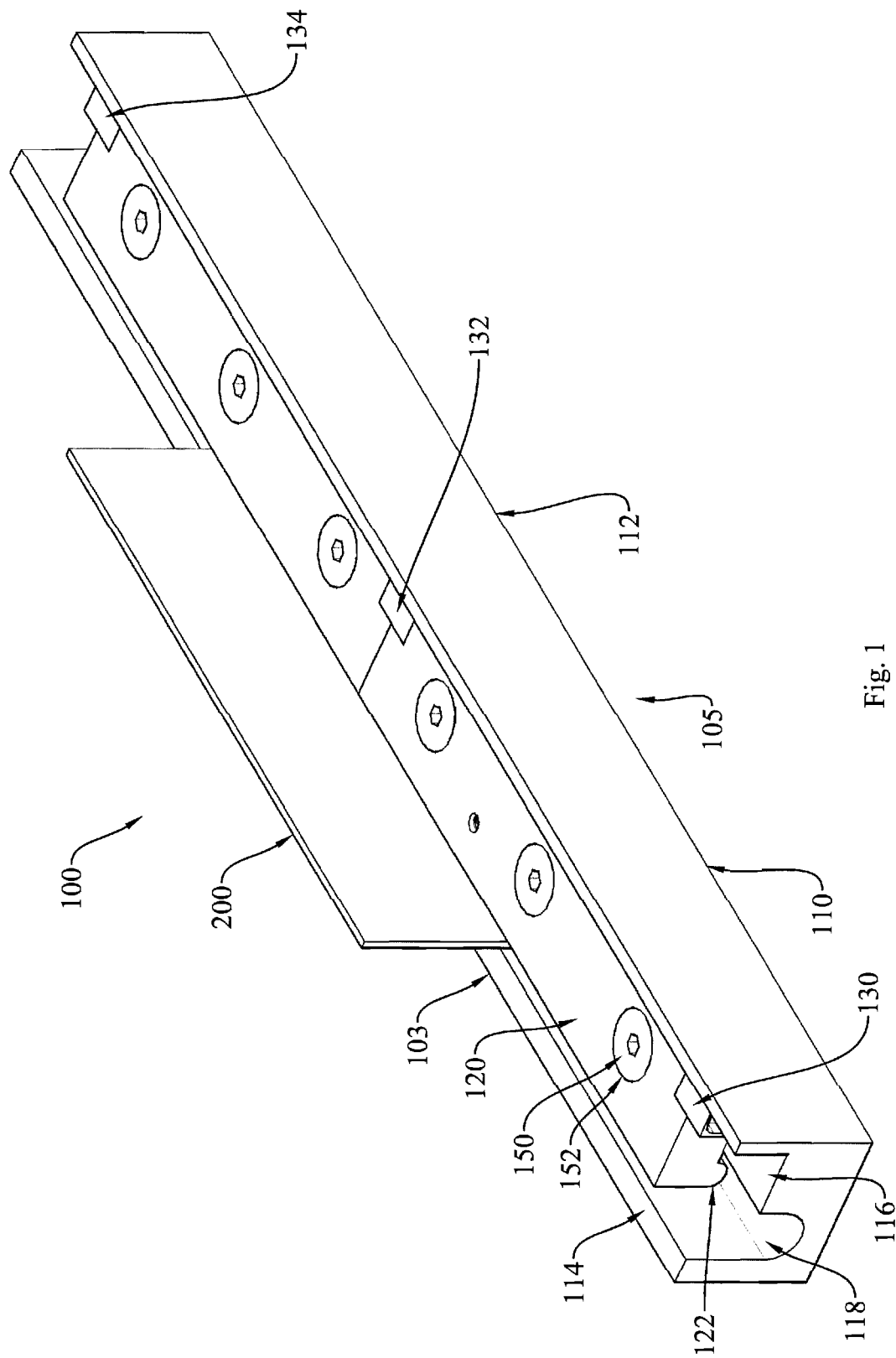
FIG. 1 is an isometric view of the flexible flood barrier system.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

FIG. 1 discloses a flexible flood barrier system 100 in the deployed position. The flexible flood barrier system 100 includes a fabric flood barrier 200 secured in place with a hinged clamp bar assembly 110.

The clamp bar assembly 110 has a top surface 103, a bottom surface 105, a first side 112 and a second side 114. A recessed shelf 116 extends along the entire longitudinal axis of the clamping bar 110 adjacent to side surface 112. An annular groove 118 is disposed at a predetermined distance below the recessed shelf 116 and extends along the entire longitudinal axis of the clamping bar 110.

The clamp bar is comprised of a plurality of hinged segments scalable to the requirements of any installation. In some embodiments, the clamp bar assembly 110 is comprised of aluminum or stainless steel. However, any material capable of functioning under the hydraulic loads encountered in these applications can be utilized and is within the intended scope of this invention.

Figure 2:
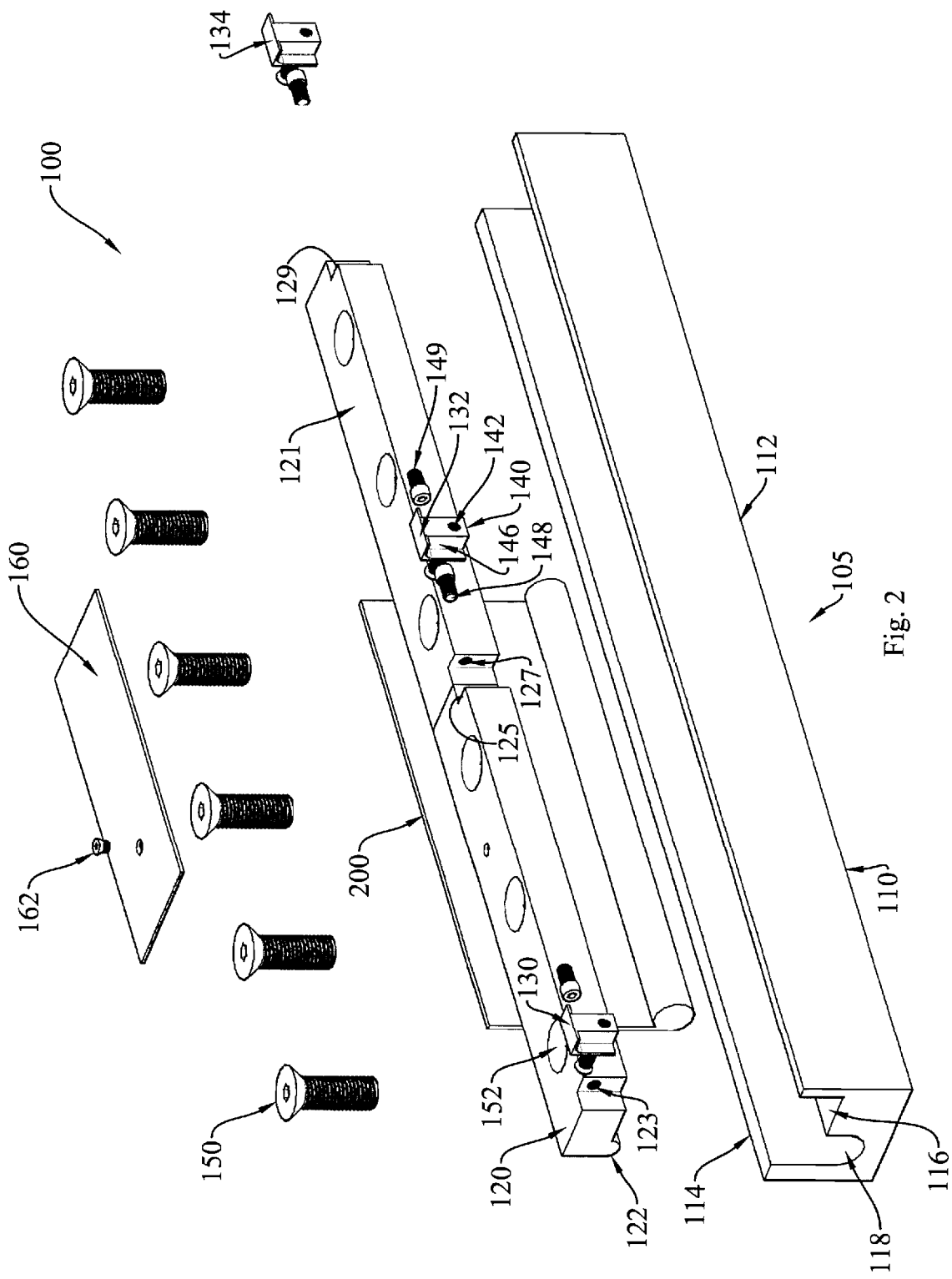
FIG. 2 is an exploded view of the flexible flood barrier system.
Figure 3:
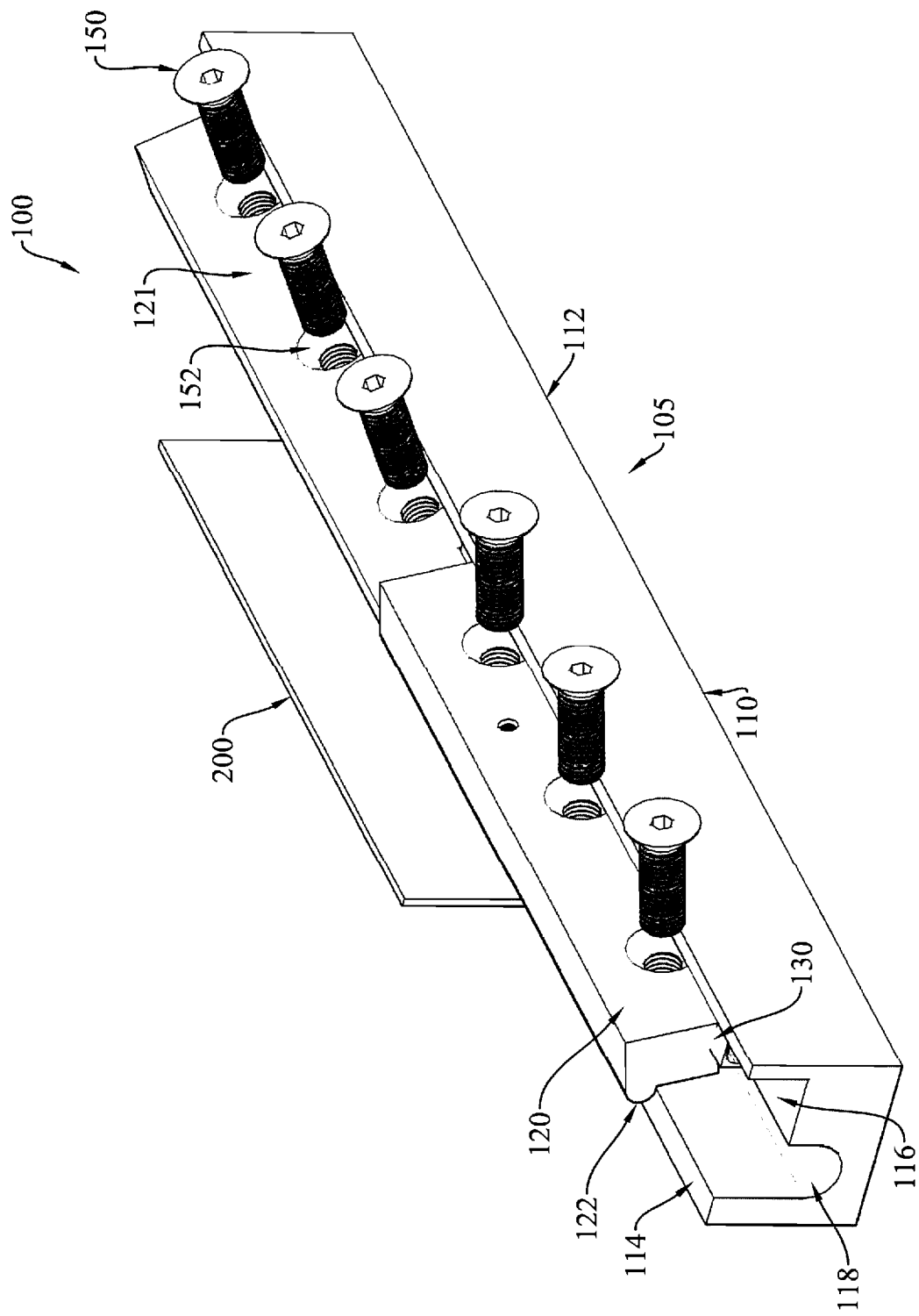
FIG. 3 is a side isometric view of the present invention with the clamp bar open.
Figure 4:
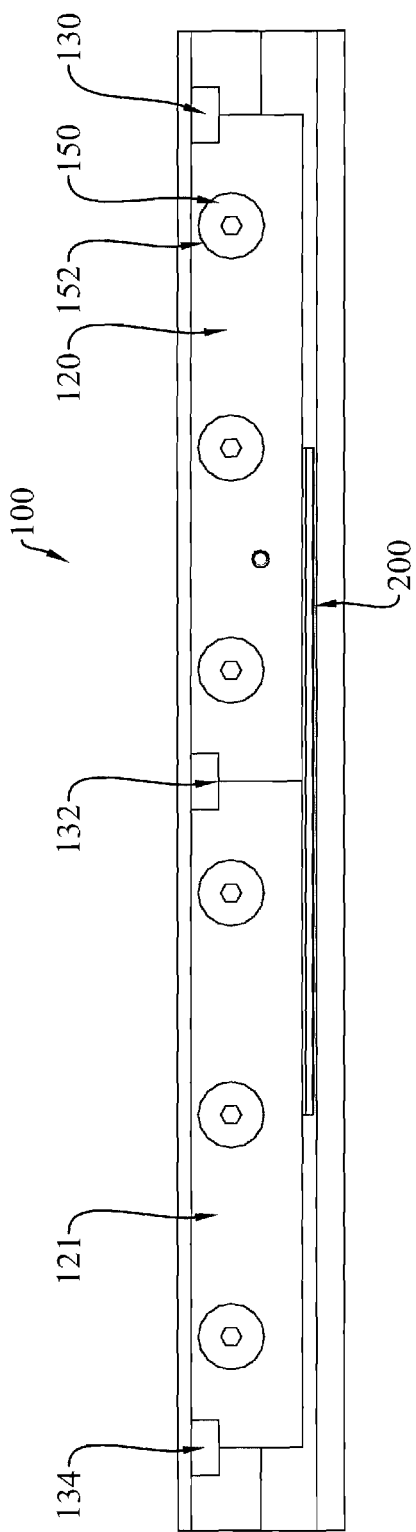
FIG. 4 is a top view of the present invention with the clam bar deployed.

The clamp bar assembly 110 is further comprised of a plurality of pressing blocks 120 and 121 connected with a plurality of hinge assemblies 130, 132, 134. As shown in FIG. 2, each hinge assembly is constructed and arranged to be interchangeable throughout the entire clamp bar system 110. For example, hinge assembly 132 includes a block 140 having an aperture 142 constructed and arranged to cooperate with a fastener 131 for fixedly attaching upon recessed shelf 116. Block 140 has another aperture 146 constructed and arranged to receive at least one guide shaft 148.

In one exemplary embodiment, pressing bar 120 has an aperture 123 at one end and aperture 125 at the opposite end. Pressing bar 121 has an aperture 127 at one end and aperture 129 at the opposite end. One end of guide shaft 148 and one end of guide shaft 149 rotatably attach to block 140. The opposite end of guide shaft 148 rotatably attached to pressing block 120 and the opposite end of guide shaft 149 rotatably attached to pressing block 149. These rotatable attachments create a hinge assembly about which the pressing blocks can rotate.

Each pressing block 120 and 121 has a protrusion 122 that extends the entire length of the clamping blocks. For example, as shown in the figures, pressing block 120 has a protrusion 122 that extends below recessed shelf 116 into annular groove 118 along the entire length of pressing bar 120. The protrusion 122 and annular groove 118 constructed of a predetermined size and shape for securing fabric flood barrier 200 in place thereby creating a watertight seal.

Additionally, the pressing blocks 120 and 121 are secured along recessed shelf 116 by a plurality of fasteners 150. Each plurality of fasteners 150 cooperates with a plurality of apertures 152 that extend through pressing blocks 120 and 121 and recessed shelf 116 for securing pressing blocks in place when the fabric flood barrier 200 is deployed.

Figure 5:
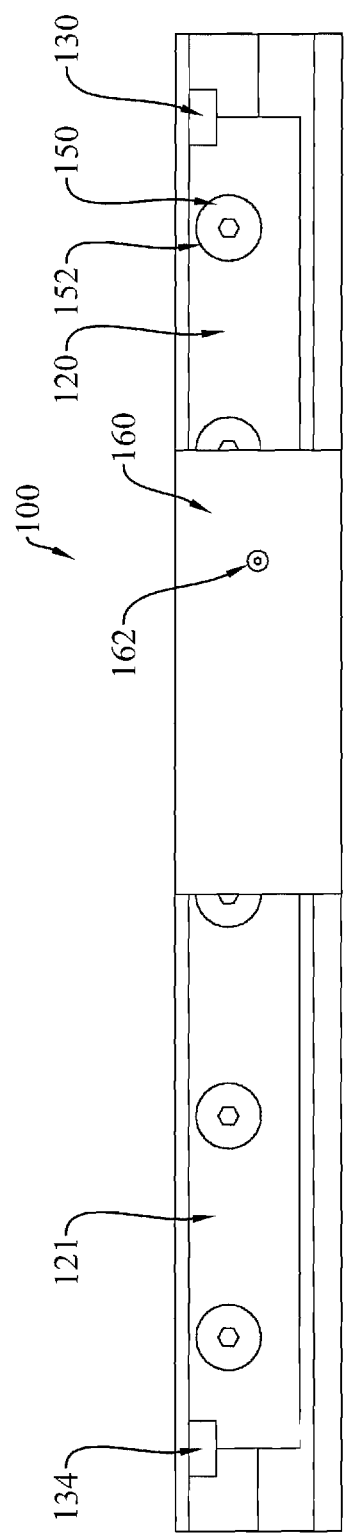
FIG. 5 is a top view of the clamp bar stowed.
Figure 7:
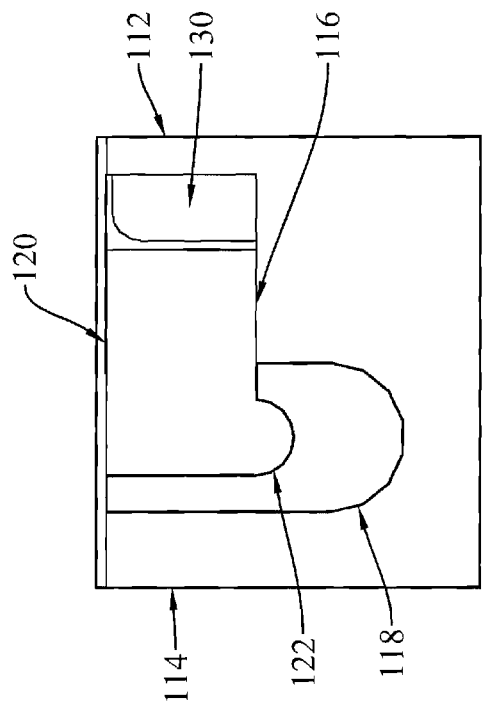
FIG. 7 is a cross-sectional side view of the clamp bar stowed.

In one embodiment, the clamp bar assembly 105 is constructed so that it capable of being installed flush with the ground to avoid creating any tripping hazards upon any walkways or entrance ways that the flood barrier system is contemplated to be installed. The clamp bar assembly 105 is also constructed and arranged to be installed flush with vertical walls along the perimeters of the fabric flood barrier 200 of the flexible flood barrier system 100. Additionally, as shown in FIGS. 2 and 5, a plate 160 can be installed over any hinge assembly where two pressing blocks are joined to prevent accidental opening or tampering with the clamp bar assembly in a stowed position. A locking screw 162 is provided to securely fasten the storage plate 160.

As depicted in FIGS. 8-10A, fabric flood barrier 200 is comprised of a plurality of layers constructed and arranged to be waterproof and provide structural support. A first layer is a waterproof membrane 210. In one non-limiting embodiment, waterproofing membrane 210 is a PVC coated polyester waterproofing membrane. A second layer is comprised of a plurality of PVC coated polyester strips 220 and 221 heat welded to the waterproofing membrane 210. Each strip having a plurality of slots constructed and arranged to thread support straps. For instance, strip 220 includes slots 222 and 223 for receipt of a horizontal strap 330, strip 220 includes slots 224 and 225 to receive horizontal strap 332, and so forth. A vertical strap 340 is positioned between the back side of the strip 220 and woven through the horizontal straps.

Figure 9B:
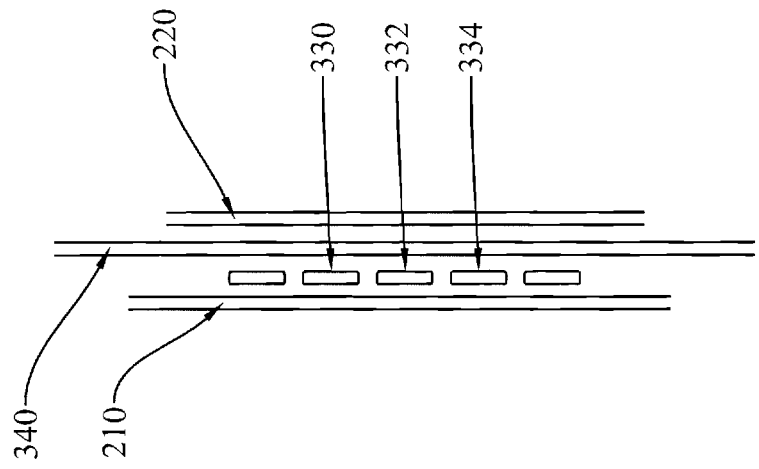
FIGS. 9A and 9B are views of the fabric barrier pattern.
Figure 9A:
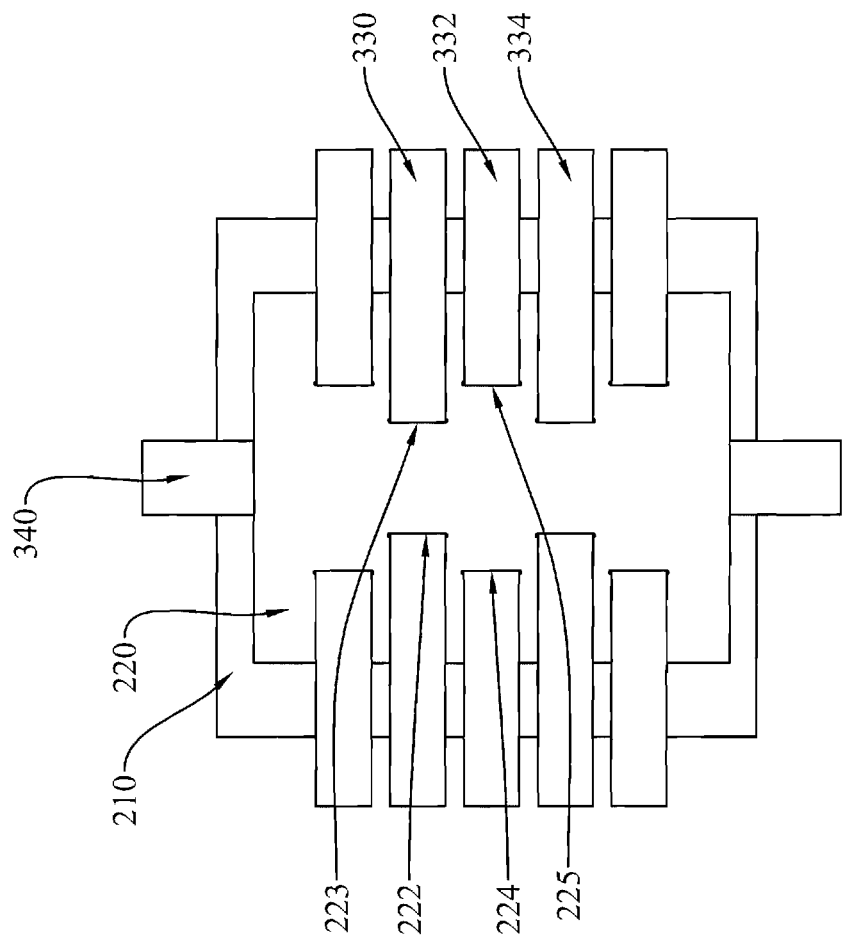

FIG. 9A is an example of the preferred configuration using a plurality of PVC coated strips which can be scaled to accommodate the dimensioning of any installation. Slots 222, 223, 224 and 225 are again depicted as illustrative; the slots are parallel to the upper and lower surface of the PVC coated strip 220. Slots 222 and 223 are space close together wherein the vertical strap 340 may be placed behind the horizontal strip 330, while slots 224 and 225 are spaced apart wherein the horizontal strap 332 may be placed in front of the vertical strap 340 while behind the strip 220. The slots are each configured to thread the vertical strap 340 through the PVC coated strips. In the preferred embodiment all straps are constructed of Kevlar. Horizontally positioned Kevlar strap 330, 332, 334 are woven between the vertical Kevlar strap 340 and the polyester strip 220. Slots 222, 223, 224, 225 are perpendicular to the upper and lower surface of the PVC coated strips 220, 221. The slots are each configured to thread horizontal Kevlar straps 330, 332 and 334 through the PVC coated strips. FIG. 9B is a cross sectional side view depicting the waterproofing membrane 210 positioned with horizontal straps 330, 332, and 334 interwoven with vertical strap 340 and strip 220

The interweaving of the Kevlar straps is continued for the entire length of the flood barrier 200 thereby creating a reinforced flood barrier that supports the waterproof membrane 210 without breaching the surface of membrane 210.

Figure 10B:
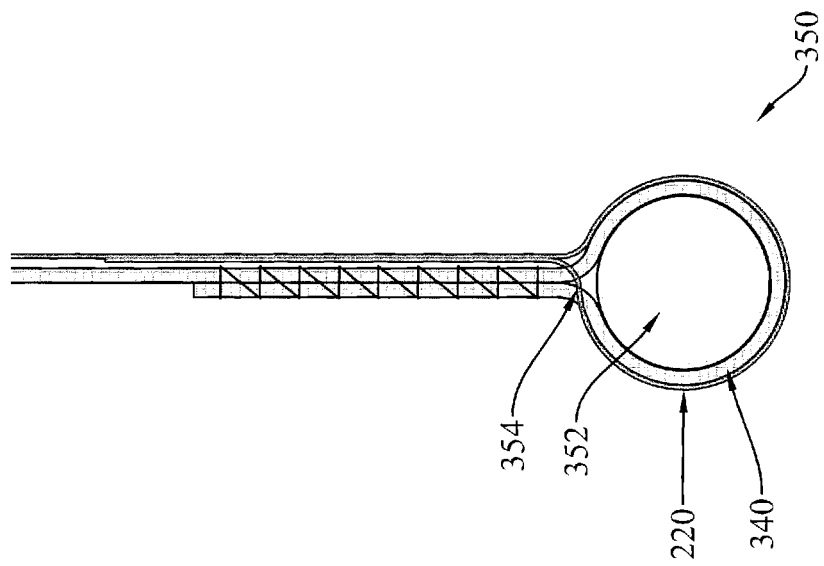
FIG. 10B is a cross-sectional view of the barrier wall hem.
Figure 10A:
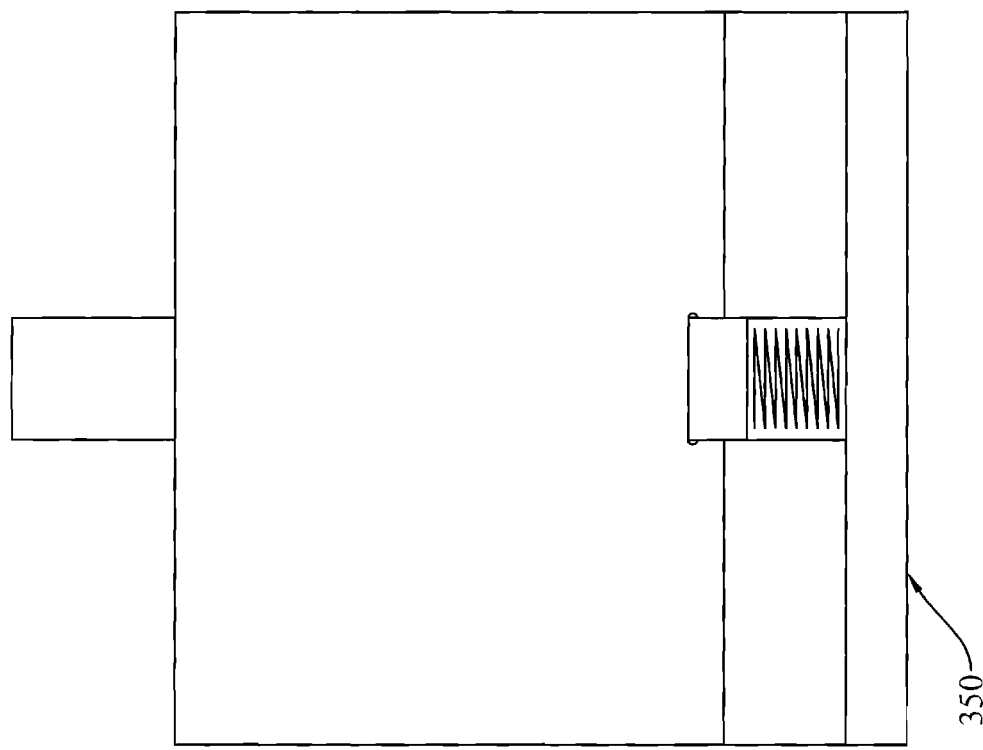
FIG. 10A is a front view of the base of the fabric barrier wall.

Along perimeter of the fabric flood barrier 200 is a hem 350 constructed and arranged to cooperate with a clamp bar assembly 110. FIG. 10A is exemplary of how each PVC coated strip with threaded Kevlar straps is configured to support the hem 350. The hem 350 is comprised of a rope 352 that extends the entire length of the fabric flood barrier 200. The PVC coated polyester waterproofing membrane 210 is wrapped tightly around the rope 352. On the dry side of the PVC coated polyester waterproofing membrane 210 is a notch 354. The Kevlar strap 340 is passed through notch 354 looped around the rope, passed back through notch 354 and stitched to itself to create closure. The PVC waterproofing membrane 210 is heat looped around rope 352 and Kevlar strap 340 and heat welded to itself around the notch 354 to create a waterproof seal.

Attached to the other end of the plurality of vertical Kevlar straps 340 are fasteners. The fasteners are constructed and arranged to cooperate with an anchoring assembly at the top of fabric flood barrier 200. For example, a wire would be extended along the upper perimeter of the opening in a structure where the flood barrier 200 is to be installed. The fasteners would be attached to the wire so that the fabric flood barrier can be extend across the entire opening. The other perimeters of fabric flood barrier would each have a hem.

Figure 6:
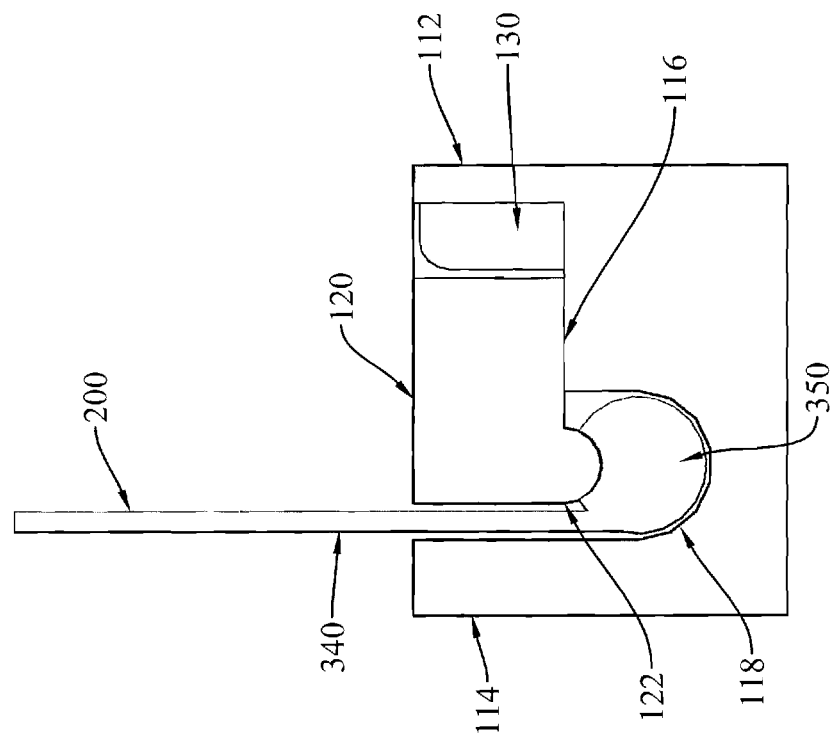
FIG. 6 is a cross-sectional side view of the clamp bar deployed.
Figure 8:
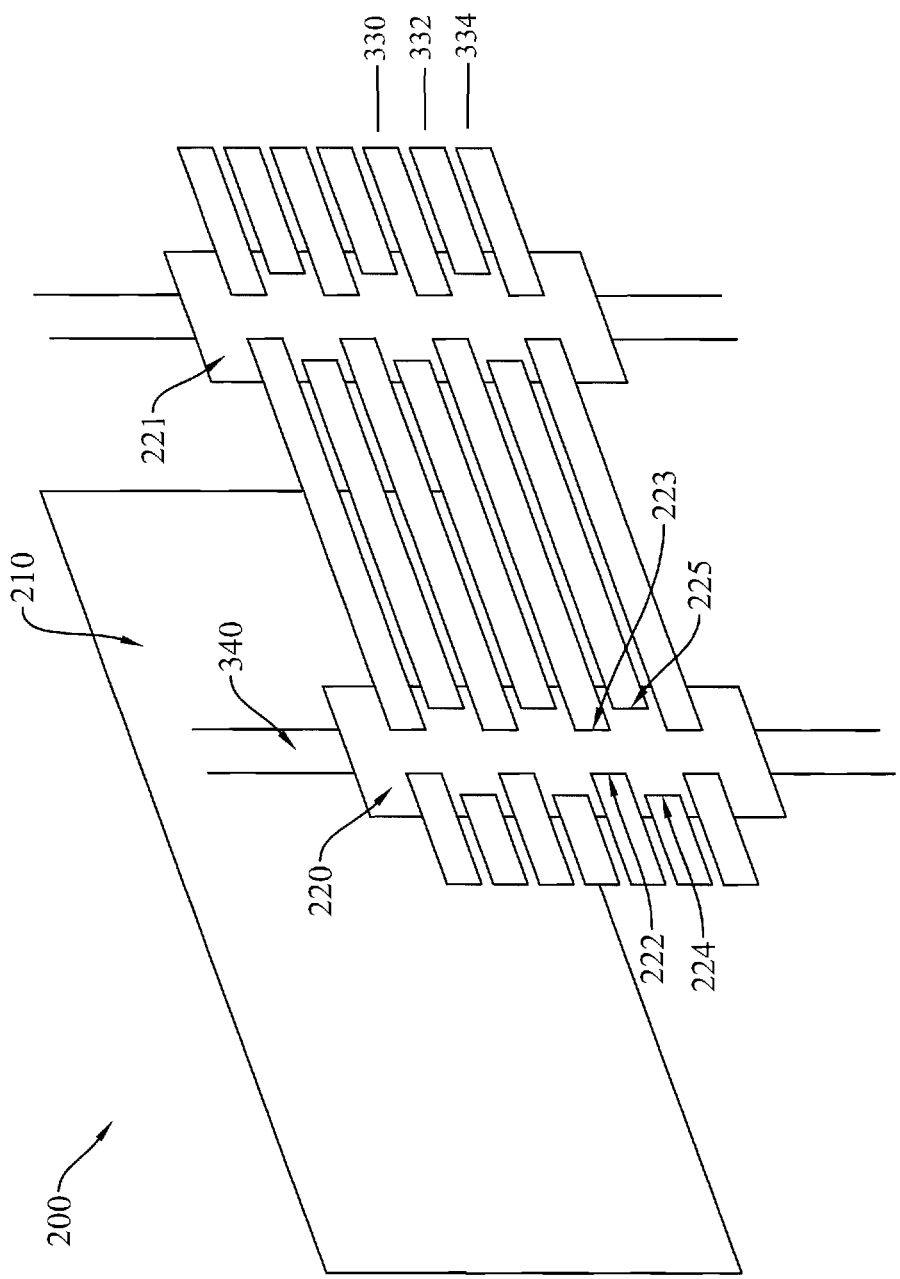
FIG. 8 is an exploded isometric view of the fabric component of the flexible flood barrier system.

In order to deploy the flexible fabric flood barrier system 100, a plurality of hinged clamp bars 110 are fixedly attached along the length of the ground that forms the base of the opening. A plurality of hinged clamp bars 110 are also fixedly attached to the vertical walls that form the perimeter of the opening of the structure to a predetermined height. The flood barrier hem is placed in the hinged clamp bars on one of the vertical walls. Then the flood barrier is extended along the anchoring assembly at the top of the flood barrier and the second hem is placed in the hinged clamp bars on the opposite vertical wall. Finally, the base of the fabric flood barrier is positioned in the set of hinged clamping that are installed upon the ground or base of the structure. Tightening of the plurality of fasteners 150 in the hinged clamp bars fixes the flood barrier in place. As seen in FIG. 6, the protrusion in the clamping bar is constructed and arranged to press upon the hem assembly fabric flood barrier to prevent leakage along the attachment points of the flexible flood barrier assembly.

Referring to FIGS. 11A, 11B and 11C, disclosed is an alternate hinge assembly block 170 for rotating pressing bars at variable angles. Hinge block assembly 170 has a top surface 171, a bottom surface 172 and side surfaces 173 and 174. The hinge block assembly 170 includes an aperture 176 that extends through the entire hinge assembly. On opposing side surfaces are channels 178 and 179. Each channel is configured at a predetermined depth along the side surfaces starting at points 180 and 181 and including a curvature, wherein the channel terminates at points 183 and 184 along the bottom surface 172 of the hinge block 170. The channels are constructed and arranged so that that hinge assembly block 170 can rotate about a set of hinges. The variable depths along the length of the channels thereby allow a user to rotate and engage each pressing bar at different angles along the channels 178 and 179.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A flood barrier system comprising
a PVC (polyvinyl chloride) coated polyester waterproof membrane having a perimeter formed by an upper edge, a bottom edge, a left side edge and a right side edge further defining a front surface and a rear surface; a plurality of PVC coated polyester strips spaced apart and heat welded to said front surface of said membrane, each said polyester strip including a plurality of spaced apart predetermined slots; a plurality of horizontal straps extending from said left side edge to said right side edge woven through said predetermined slots formed in said spaced apart strips; a plurality of vertical straps extending from said upper edge to said bottom edge woven through said predetermined slots formed in said spaced apart strips; a hem formed along said perimeter, said hem having a rope extending along each edge of said membrane with said membrane wrapped around said rope with a plurality of notches for receipt of strap ends which are passed through each notch and looped around said rope and returned through each said notch, said strap stitched to itself to create closure and said membrane is heat welded to itself around said notch to create a waterproof seal; and a clamp bar assembly for securing said hem, said clamp bar assembly having a top surface, a bottom surface, a first side and a second side with a recessed shelf extending along a longitudinal axis adjacent to said first side surface with an annular groove disposed at a predetermined depth below said recessed shelf, said clamp bar comprised of a plurality of pressing blocks connected with a plurality of hinge assemblies for securing said hem in said annular groove; wherein said membrane secured by said hem within said clamp bar assembly prevents the passage of water through an opening.

2. The flood barrier system according to claim 1 wherein said straps are Kevlar.

3. The flood barrier system according to claim 1 wherein said vertically positioned straps include an upper end securable to a fastener placed along a top of an opening.

4. The flood barrier system according to claim 1 wherein said strips include horizontally disposed parallel slots that are spaced apart a distance to allow for vertical straps to be woven therethrough.

5. The flood barrier system according to claim 4 wherein said strips include vertically disposed parallel slots that are spaced apart a distance to allow for horizontal straps to be woven therethrough, said vertical straps further woven through said horizontal straps.

6. The flood barrier system according to claim 1 wherein each said hinge assembly includes a block having an aperture constructed and arranged to cooperate with a fastener for fixedly attaching upon said a hem within said recessed shelf, each said block having an aperture constructed and arranged to receive at least one guide shaft for rotation of said block.

7. The flood barrier system according to claim 6 wherein each said block has a protrusion that extends below said recessed shelf into said annular groove, said protrusion and said annular groove constructed of a predetermined size and shape for deforming said hem into a watertight seal.

8. The flood barrier system according to claim 6 wherein said blocks are secured along said recessed shelf by a plurality of fasteners that extend through said clamping blocks and said recessed shelf for securing said blocks in place.

9. The flood barrier system according to claim 1 wherein said block is a hinge assembly block having a top surface, a bottom surface and opposing side surfaces with an aperture that extends from the top surface through the bottom surface, said opposing side surface have a channel configured at a predetermined curvature depth wherein said hinge assembly blocks is constructed and arranged to rotate and engage each pressing bar at different angles along the channels to allow rotation of pressing bars at variable angles.

* * * * *